(12) United States Patent
Uchida et al.

(10) Patent No.: US 7,344,693 B2
(45) Date of Patent: Mar. 18, 2008

(54) PROCESS FOR PRODUCING ZIRCONIA POWDER

(75) Inventors: Yoshio Uchida, Tsukuba (JP); Ichiro Tanaka, Invercargill (NZ)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 10/140,054

(22) Filed: May 8, 2002

(65) Prior Publication Data

US 2002/0182141 A1    Dec. 5, 2002

(30) Foreign Application Priority Data

Jun. 4, 2001    (JP) .............................. 2001-167814

(51) Int. Cl.
    *C01G 25/00*    (2006.01)
(52) U.S. Cl. ...................... 423/608; 423/266; 423/275
(58) Field of Classification Search ................ 423/608, 423/266, 275; 241/5, 15, 22, 23
    See application file for complete search history.

(56) References Cited

U.S. PATENT DOCUMENTS

| 5,460,701 | A | 10/1995 | Parker et al. |
| 5,514,349 | A | 5/1996 | Parker et al. |
| 5,688,480 | A * | 11/1997 | Mohri et al. ................. 423/263 |
| 5,874,684 | A | 2/1999 | Parker et al. |
| 6,303,091 | B1 * | 10/2001 | Mohri et al. ................. 423/263 |
| 6,982,073 | B2 * | 1/2006 | Sabacky et al. ............ 423/608 |

FOREIGN PATENT DOCUMENTS

| EP | 0 517 437 B1 | 3/1997 |
| JP | 5-24841 A | 2/1993 |
| JP | 6-171943 A | 6/1994 |
| JP | 7-187613 A | 7/1995 |
| JP | 9-502920 A | 3/1997 |
| SU | 1 733 384 A1 | 5/1992 |

OTHER PUBLICATIONS

Patent Abstracts of Japan, vol. 008, No. 007 (C-204), Jan. 12, 1984.
Patent Abstracts of Japan, vol. 017, No. 303 (C-1069), Jun. 10, 1993.

* cited by examiner

*Primary Examiner*—Steven Bos
(74) *Attorney, Agent, or Firm*—Sughrue Mion, PLLC.

(57) ABSTRACT

There are provided:
  (I) a process for producing zirconia powder, which comprises the step of calcining a zirconium salt in an atmosphere containing hydrogen chloride, and
  (II) a process for producing zirconia powder, which comprises the steps of:
      (1) pre-calcining a zirconium salt to obtain a pre-calcined product, and
      (2) calcining the pre-calcined product in an atmosphere containing hydrogen chloride.

14 Claims, No Drawings

PROCESS FOR PRODUCING ZIRCONIA POWDER

FIELD OF THE INVENTION

The present invention relates to a process for producing zirconia powder.

BACKGROUND OF THE INVENTION

A sintered body of zirconia obtained by sintering zirconia powder has been used as ceramics for various kinds of structural materials, because of its superior properties of strength, toughness, hardness and corrosion. In recent years, its superior strength, hardness and corrosion resistance have been particularly noted, and as a result, the sintered body of zirconia has been extensively used for a ferrule, which is a part of an optical fiber connector. Among sintered body of zirconia, those comprising fine grain have superior above-mentioned properties, and therefore, it is desired to obtain fine-particle zirconia powder having a primary particle diameter of not more than 0.1 µm.

As a process for producing fine zirconia powder, for example, JP-A5-24841 discloses a process consisting of the steps of:

(1) dissolving zirconium oxychloride in water to obtain a solution, (2) heating the solution and hydrolyzing zirconium oxychloride therein to precipitate zirconia hydrate, (3) drying the precipitated zirconia hydrate, and (4) calcining the dried zirconia hydrate at 850° C. to obtain zirconia powder having a primary particle diameter of not more than 0.1 µm.

However, the above-mentioned process has a problem that a reaction rate of the hydrolysis in the step (2) is so slow that it takes as long as 80 hours until the hydrolysis reaches 84%.

SUMMARY OF THE INVENTION

An object of the present invention is to provide a process for producing fine zirconia powder with ease.

The present inventor has undertaken extensive studies to attain the above object. As a result, it has been found that when a zirconium salt is calcined in an atmosphere containing hydrogen chloride, fine zirconia powder can be obtained without a hydrolyzing step. Thereby, the present invention has been obtained.

The present invention provides a process for producing zirconia powder, which comprises the step of calcining a zirconium salt in an atmosphere containing hydrogen chloride.

The present invention also provides a process for producing zirconia powder, which comprises the steps of:

(1) pre-calcining a zirconium salt to obtain a pre-calcined product, and (2) calcining the pre-calcined product in an atmosphere containing hydrogen chloride.

DETAILED DESCRIPTION OF THE INVENTION

Examples of a zirconium salt used in the present invention are zirconium oxychloride, zirconium nitrate, zirconium chloride and zirconium sulfate. Of these, preferred is zirconium oxychloride. It is permitted to use zirconia hydrate as the zirconium salt, which hydrate is obtained by a process comprising the steps of (i) dissolving zirconium oxychloride in water to obtain a solution, and (ii) heating the solution and hydrolyzing zirconium oxychloride therein to precipitate zirconia hydrate. However, it is not recommendable to use such zirconia hydrate, because a long period of time is needed for the hydrolyzing. When it is required to produce high purity zirconia powder, it is recommendable to use a high purity zirconium salt.

When using zirconium oxychloride as a starting material, it is possible to carry out a calcining step in an atmosphere containing not less than pre-determined concentration of hydrogen chloride gas, by holding hydrogen chloride gas in an calcining furnace, which hydrogen chloride gas generates from the starting material.

When a seed crystal having a primary particle diameter of not more than about 0.1 µm is added to the zirconium salt used in the present invention, zirconia powder having a small particle diameter can be obtained. It seems that the seed crystal functions as an origin for the formation of zirconia powder having a small particle diameter. In order to obtain zirconia powder having a primary particle diameter of not more than 0.1 µm, it is recommendable to use a seed crystal having a primary particle diameter of not more than about 0.1 µm.

As the seed crystal, zirconia powder and zirconia gel can be exemplified. The seed crystal is used in an amount of usually from 0.1 to 20% by weight, provided that the sum of (i) the amount of the zirconium salt in terms of zirconia and (ii) the amount of the seed crystal is 100% by weight. In the present invention, the above-mentioned phrase of "amount of the zirconium salt in terms of zirconia" and the phrase like that mean "the amount of zirconia when the zirconium salt is converted to zirconia". As far as the amount is within said range, there is a tendency that zirconia powder having a smaller particle diameter can be obtained with increase of the amount of the seed crystal used.

As a method for mixing the zirconium salt with the seed crystal, there is exemplified a mixing method comprising the step of mixing both by an industrially and conventionally used mixing apparatus such as a ball mill, DYNO-MILL (trademark) manufactured by Willy A. Bachofen AG Maschinenfabrik, a vibrating mill, a vertical granulator and a Henschel mixer. The mixing may be carried out according to a dry mixing method or a wet mixing method. The seed crystal may be mixed with a zirconium salt obtained by a pre-calcining as mentioned below. It is possible to control a particle diameter of zirconia by varying a temperature of the pre-calcining. The lower the temperature of the pre-calcining is, the smaller the particle diameter of the zirconia is.

In order to increase strength of a sintered body of zirconia, which product is obtained by sintering the zirconia powder produced by the process of the present invention, the zirconium salt may be used in combination with a stabilizer or its precursor. Examples of the stabilizer are (i) a compound of at least one element selected from the group consisting of Y, Ce, Ca, Ti and Mg, which compound is converted to an oxide of said element by calcining, and (ii) an oxide of said element. The stabilizer is used in an amount of usually from 0.1 to 20% by mole, provided that the sum of (i) the amount of the stabilizer and (ii) the amount of the zirconium salt in terms of zirconia is 100% by mole. When the zirconium salt is used in combination with the seed crystal, the above-mentioned "(ii) the amount of the zirconium salt in terms of zirconia" means the sum of (a) the amount of zirconia when the zirconium salt is converted to zirconia and (b) the amount of zirconia when the seed crystal is converted to zirconia.

In order to increase density of a sintered body of zirconia, which body is obtained by sintering the zirconia powder produced by the process of the present invention, the zirconia powder may be used in combination with a sintering agent or its precursor. Examples of the sintering agent are (i) alumina such as transition alumina and α-alumina, and (ii) aluminum compounds such as aluminum hydroxide, aluminum nitrate, aluminum sulfate and aluminum oxalate, which compounds are converted to alumina by calcining. When aluminum hydroxide or transition alumina or α-alumina is used, it is preferable to use a powdery sintering agent having a superior dispersibility. The sintering agent is used in an amount of usually from 0.1 to 10% by weight, provided that the sum of (i) the amount of the sintering agent and (ii) the amount of the zirconium salt in terms of zirconia is 100% by weight. When the zirconium salt is used in combination with the above-mentioned stabilizer, said 100% by weight includes the amount of the stabilizer, too. Further, when the zirconium salt is used in combination with the seed crystal, the above-mentioned "(ii) the amount of the zirconium salt in terms of zirconia" means the sum of (a) the amount of zirconia when the zirconium salt is converted to zirconia and (b) the amount of zirconia when the seed crystal is converted to zirconia.

Prior to the calcining step in the present invention, a step of drying the zirconium salt may be added to remove moisture present in the zirconium salt. The drying can be carried out usually in air, and a drying temperature is usually not lower than 50° C. but lower than 200° C. Further, prior to the calcining step in the present invention, a step of pre-calcining the zirconium salt may be added to remove water of crystallization present in the zirconium salt. The pre-calcining can be carried out usually in air, and a preferred pre-calcining temperature depends upon a kind of the zirconium salt, and it is usually not lower than 200° C. but lower than 700° C.

Prior to the calcining step in the present invention, a step of milling the zirconium salt or amorphous zirconia may be added. When the milling step is added, it may be expected that the zirconium salt having a small average primary particle diameter can be obtained, or the zirconium salt having a narrow particle distribution can be obtained. The milling can be carried out with an industrially and conventionally used milling such as a ball mill, a vibrating mill, a dynamic mill and a fine mill.

It is possible to add the seed crystal, the stabilizer or the sintering agent in the milling step.

The calcining step in the present invention is carried out in a hydrogen chloride-containing atmosphere. The hydrogen chloride gas may be used in combination with an inert gas such as nitrogen and argon, or with a gas such as air and oxygen. A concentration of hydrogen chloride in the hydrogen chloride-containing atmosphere is preferably not less than 1% by volume, and more preferably from 5 to 95% by volume, from a viewpoint or producing zirconia powder having a uniform shape, or from a viewpoint of producing zirconia powder which can form a sintered body of zirconia having a high density. The concentration of hydrogen chloride in the hydrogen chloride-containing atmosphere may be 100% by volume.

A preferred temperature of the calcining step in the present invention is from 700 to 1100° C. from a viewpoint of producing zirconia powder capable of forming a sintered body of zirconia having a high density. A preferred time of the calcining step is from 0.5 to 10 hours.

Details are not clear, but it seems that the stabilizer and the sintering agent can be uniformly dispersed by virtue of zirconia in the calcining step, because the calcining step involves a gas phase reaction.

The zirconia powder produced by the process of the present invention can be milled with an industrially and conventionally used milling machine such as a wet type ball mill, a dry type ball mill, a vibrating mill, DYNO-MILL (trademark) manufactured by Willy A. Bachofen AG Maschinenfabrik, a dynamic mill and a fine mill to obtain a further fine zirconia powder having a superior dispersibility, which powder can form a sintered body of zirconia having a higher density. When the zirconia powder is ground in combination with the stabilizer or the sintering agent, the zirconia powder can be well mixed with the stabilizer or the sintering agent, because the zirconia powder milled has a superior dispersibility.

The zirconia powder produced by the process in accordance with the present invention may have a chlorine ion adsorbed on its surface. When use of such zirconia powder is not preferable, the chlorine ion can be removed by washing with water or by heat-treating.

According to the process in accordance with the present invention, zirconia powder having a uniform particle shape can be produced directly from the zirconium salt. And furthermore, a sintered body having a high density can be produced by forming and sintering said zirconia powder.

As a process for producing a sintered body of zirconia from the zirconia powder produced by the process of the present invention, there are exemplified the following industrially and conventionally used process A and process B.

Process A comprising the steps of:
(1) dispersing zirconia powder in water to obtain a slurry,
(2) adding a resin binder such as polyvinyl alcohol and an acrylic resin emulsion to the slurry,
(3) drying the slurry with a spray drier to obtain granules,
(4) molding the granules by a forming method such as a uniaxial pressing method and a cold isostatic pressing method to obtain a green body, and
(5) sintering the green body at a temperature of from 1250 to 1600° C. in air atmosphere to obtain a sintered body of zirconia having a high density.

Process B comprising the steps of:
(1) kneading a mixture of zirconia powder and an organic compound such as a thermoplastic resin to obtain a kneaded product,
(2) molding the kneaded product by a molding method such as an injection molding method and an extrusion molding method to obtain a green body,
(3) heating the green body to remove the organic compound contained in the green body to obtain a pre-heated body, and
(4) sintering the pre heated body to obtain a sintered body of zirconia having a high density.

In the case where the zirconia powder produced by the process of the present invention is used in the above-mentioned process B, a content of the zirconia powder in the kneaded product obtained in the step (1) can be increased. Therefore, a shrinkage ratio of not only the molded product in the step (3) but also the heat-treated product in the step (4) can be held to a low degree. As a result, a sintered body of zirconia having a high dimensional accuracy and a high density can be produced.

The zirconia powder produced by the process of the present invention is a superior starting material for producing an abrasive, which hardly give an scrach to an article's surface to be ground, because the particle in the zirconia powder has, in spite of a fine particle, a high crystallinity and a uniform primary particle size.

The zirconia powder produced by the process of the present invention is suitable as (i) an abrasive for magnetic media in order to remove dirt on a magnetic head and (ii) an abrasive added to a toner in order to remove dirt on a drum mounted on a copying machine. The zirconia powder can be uniformly mixed with magnetic matters used for magnetic media or carbon powder used for the toner, because both of them are fine particle.

The zirconia powder produced by the process of the present invention is suitable as a filler to improve properties of a resin, such as abrasion resistance, rigidity and strength, because the zirconia powder can be easily dispersed in the resin or a solvent, which solvent is used in case of dispersing the resin therein.

The zirconia powder produced by the process of the present invention is suitable for an injection molding and a slip-cast molding. The sintered body obtained from the zirconia powder is suitable for various known applications of a sintered body, particularly for ferrule or milling media, because the sintered body has a high density, a high strength, a high hardness and a high corrosion resistance.

Further, the zirconia powder produced by the process of the present invention is also suitable for an abrasive, a filler for a resin and a filler for magnetic media.

According to the process of the present invention, fine zirconia powder suitable for extensively wide application mentioned above can be produced with ease within a short period of time, and therefore the present invention is industrially extremely useful.

EXAMPLE

The present invention is explained with reference to the following Examples, which do not limit the scope of the present invention.

1. Observation of Particle Shape

A shape of a primary particle was determined by observing a powdery sample with a scanning electron microscope, Type T-300, manufactured by JEOL Ltd.

2. Measurement of BET Specific Surface Area

A BET specific surface area was determined with a BET specific surface area measuring apparatus, a trade name of FLOWSORB 2300II, manufactured by Shimadzu Corporation.

Example 1

100 Grams of zirconium oxychloride (the highest quality reagent, manufactured by Wako Pure Chemical Industries, Ltd.) was dried in air at 130° C. for 5 hours. To the dried zirconium oxychloride, zirconia powder having a primary particle diameter of 0.1 μm (a trade name of TZOY, manufactured by Tosoh Corporation) was added as a seed crystal, and both were mixed for 6 hours in a ball mill to obtain a mixture. The above-mentioned seed crystal was used in an amount of 10% by weight based on 100% by weight of the sum of the amount of the zirconium oxychloride in terms of zirconia and the amount of the seed crystal.

The mixture was calcined in an atmosphere consisting of 90% by volume of hydrogen chloride and 10% by volume of air at 830° C. for 1 hour to obtain zirconia powder. The zirconia powder obtained was found to have a uniform particle shape, a primary particle diameter of 0.1 μm and a BET specific surface area of 15.4 m$^2$/g.

To the zirconia powder obtained, yttrium oxide having a primary particle diameter of 0.4 μm manufactured by Nihon Yttrium was added in an amount of 3% by mole based on 100% by mole of the sum of the amount of the zirconia powder and the amount of the yttrium oxide (amount of $Y_2O_3 \times 100/$(amount of $ZrO_2$+amount of $Y_2O_3$)=3). The mixture obtained was milled for 12 hours in a wet type ball mill, and dried to obtain a dried powder.

The dried powder obtained was formed into a pellet form using a uniaxial press. The obtained green body was sintered at 1350° C. to obtain a sintered body having a density of 6.00 g/cm$^3$. On the other hand, the obtained green body was sintered at 1400° C. to obtain a sintered product having a density of 6.02 g/cm$^3$.

Example 2

100 Grams of zirconium oxychloride (the highest quality reagent, manufactured by Wako Pure Chemical Industries, Ltd.) was dried in air at 130° C. for 5 hours. To the dried zirconium oxychloride, zirconia powder (as a seed crystal) having a primary particle diameter of 0.1 μm (a trade name of TZOY, manufactured by Tosoh Corporation) and yttrium oxide having a primary particle diameter of 0.4 μm manufactured by Nihon Yttrium were added, and the resultant was mixed for 6 hours in a ball mill. The above-mentioned seed crystal was used in an amount of 3% by weight based on 100% by weight of the sum of the amount of the zirconium oxychloride in terms of zirconia and the amount of the seed crystal. And the above-mentioned yttrium oxide was used in an amount of 3% by mole based on 100% by mole of the sum of the amount of the zirconium oxychloride in terms of zirconia, the amount of the seed crystal and the amount of the yttrium oxide.

The resulting mixture was calcined in an atmosphere consisting of 90% by volume of hydrogen chloride and 10% by volume of air at 950° C. for 1 hour to obtain powder.

The powder obtained was milled for 12 hours in a wet type ball mill to obtain zirconia powder. The zirconia powder obtained was found to have a uniform particle shape, a primary particle diameter of 0.1 μm and a BET specific surface area of 18.0 m$^2$/g.

The zirconia powder obtained was formed into a pellet form using a uniaxial press. The obtained green body was sintered at 1350° C. to obtain a sintered body having a density of 6.02 g/cm$^3$. On the other hand, the obtained green body was sintered at 1400° C. to obtain a sintered body having a density of 6.04 g/cm$^3$.

Example 3

100 Grams of zirconium oxychloride (the highest quality reagent, manufactured by Wako Pure Chemical Industries, Ltd.) was dried in air at 130° C. for 5 hours. The resultant was calcined in an atmosphere consisting of 30% by volume of hydrogen chloride and 70% by volume of air at 1000° C. for 1 hour to obtain powder. Total time, namely, the time required for raising temperature from ambient temperature to 1000° C.+the time required for calcining at 1000° C. (1 hour)+the time required for lowering temperature from 1000° C. to ambient temperature, was about 6 hours. The powder obtained was found to have a uniform particle shape, a primary particle diameter of 0.2 μm and a BET specific surface area of 7.8 m$^2$/g.

Example 4

100 Grams of zirconium oxychloride (the highest quality reagent, manufactured by Wako Pure Chemical Industries, Ltd.) was dried in air at 130° C. for 5 hours. To the dried zirconium oxychloride, yttrium oxide having a primary particle diameter of 0.4 μm manufactured by Nihon Yttrium was added in an amount of 3% by mole based on 100% by mole of the sum of the amount of the zirconium oxychloride in terms of zirconia and the amount of the yttrium oxide. Both were mixed for 6 hours in a ball mill to obtain a mixture.

The mixture obtained was calcined in an atmosphere consisting of 90% by volume of hydrogen chloride and 10% by volume of air at 950° C. for 1 hour to obtain zirconia powder. The obtained zirconia powder was found to have a primary particle diameter of 0.1 μm and a BET specific surface area of 15.0 m²/g.

Example 5

100 Grams of zirconium oxychloride (the highest quality reagent, manufactured by Wako Pure Chemical Industries, Ltd.) was dried in air at 130° C. for 5 hours. To the dried zirconium oxychloride, zirconia gel manufactured by Nissan Chemical Industries, Ltd. was added as a seed crystal in an amount of 5% by weight based on 100% by weight of the sum of the amount of the zirconium oxychloride in terms of zirconia and the amount of the seed crystal. Both were mixed for 6 hours in a ball mill to obtain a mixture.

The mixture obtained was calcined in an atmosphere consisting of 90% by volume of hydrogen chloride and 10% by volume of air at 800° C. for 1 hour to obtain zirconia powder. The obtained zirconia powder was found to have a primary particle diameter of 0.1 μm and a BET specific surface area of 16.0 m²/g.

Example 6

Zirconium oxychloride (the highest quality reagent, manufactured by Wako Pure Chemical Industries, Ltd.) as a starting material was pre-calcined in air at 600° C. for 3 hours to obtain a pre-calcined product. To the pre-calcined product, $Y_2O_3$ having an average particle diameter of 0.4 μm manufactured by Nihon Ytrrium was added in an amount of 5.25% by weight based on 100% by weight of the total amount of the $Y_2O_3$ and the pre-calcined product. Both were mixed for 6 hours in a ball mill to obtain a mixture.

The obtained mixture was calcined in an atmosphere consisting of 30% by volume of hydrogen chloride and 70% by volume of air at 900° C. for 1 hour to obtain a zirconia powder particle.

The zirconia powder particle obtained was found to have a uniform polyhedron shape, a primary particle diameter of 10 to 50 nm and a BET specific surface area of 23.4 m²/g.

Example 7

Example 6 was repeated to obtain a zirconia powder particle, except that the temperature of pre-calcining was changed to 650° C.

The obtained zirconia powder particle was found to have a uniform polyhedron shape, a primary particle diameter of 30 to 80 nm and a BET specific surface area of 19.4 m²/g.

Example 8

Example 6 was repeated to obtain a zirconia powder particle, except that the calcining atmosphere and the cacining temperature were changed to an atmosphere consisting of 5% by volume of hydrogen chloride and 95% by volume of air and 1000° C., respectively.

The obtained particle was found to have a polyhedron shape, a primary particle diameter of 40 to 90 nm and a BET specific surface area of 17.3 m²/g.

Example 9

Example 6 was repeated to obtain a zirconia powder particle, except that (i) 5.25% by weight of $Y_2O_3$ and 0.25% by weight of alumina, AKP-30 (trade name), manufactured by Sumitomo Chemical Co., Ltd. were added to the pre-calcined product based on 100% by weight of the total amount of $Y_2O_3$, alumina and the pre-calcined product to obtain a mixture, and (ii) the mixture was calcined in an atmosphere consisting of 30% by volume of hydrogen chloride and 70% by volume of air at 1000° C. The obtained zirconia powder particle was milled for 12 hours in a wet type ball mill, and dried to obtain a dried powder.

By the similar method to that in Example 1, the dried powder obtained was formed into a pellet form, and a green body was sintered at 1350° C. to obtain a sintered body having a density of 6.05 g/cm³.

Example 10

2 Kilograms of zirconium oxychloride contained in a 50-liter container made of quartz was calcined while exhausting generating gas into the atmosphere. A concentration of hydrogen chloride in the calcining atmosphere was considered to be surely not less than 10% by volume because of its generating volume of not less than 200 liters. The obtained zirconia powder particle was found to have a polyhedron shape, a primary particle diameter of 30 to 60 nm and a BET specific surface area of 24.1 m²/g.

According to the present invention, any step was not needed prior to the pre-calcining step, because a commercially available zirconium oxychloride can be used directly as a starting material. Time needed in respective steps for producing the zirconia powder particle in Examples 6, 7 and 8 were (i) about 8 hours for the pre-calcining step, (ii) total 6 hours for the adding step and the mixing step, and (iii) about 6 hours for the calcining step (including time required for raising temperature from ambient temperature to 900° C. and time required for lowering temperature from 900° C. to ambient temperature).

Comparative Example 1

Example 3 was repeated, except that the calcining was carried out in an air atmosphere, to obtain a particulate powder. Since aggregation of the obtained powder was strong, it was difficult to disperse it in a wet type ball mill. The obtained powder contained a hard aggregate having a particle diameter of about 0.1 mm. Said particle was found to have an uneven (non-uniform) shape by the observation with a scanning electron microscope.

The invention claimed is:

1. A process for producing zirconia powder, which comprises the steps of:
    milling a zirconium salt, and
    calcining the zirconium salt in an atmosphere containing hydrogen chloride,
    wherein the zirconium salt is at least one selected from the group consisting of zirconium oxychloride, zirconium nitrate, zirconium chloride and zirconium sulfate, and contains:
    (i) a compound of at least one element selected from the group consisting of Y, Ce, Ca, Ti and Mg, which compound is converted to an oxide of said element by calcining, or (ii) an oxide of at least one element selected from the group consisting of Y, Ce, Ca, Ti and Mg.

2. The process for producing zirconia powder according to claim 1, wherein the zirconium salt contains zirconium oxychloride.

3. The process for producing zirconia powder according to claim 1, wherein the atmosphere containing hydrogen chloride has a concentration of hydrogen chloride of not less than 1% by volume.

4. The process for producing zirconia powder according to claim 1, wherein the calcining is carried out at a temperature of 700 to 1100° C.

5. The process for producing zirconia powder according to claim 1, wherein the zirconium salt is a combination with a seed crystal.

6. The process for producing zirconia powder according to claim 1, wherein the zirconium salt is a combination with:
   (i) an aluminum compound, which is converted to alumina by calcining, or
   (ii) alumina.

7. A process for producing zirconia powder, which comprises the steps of:
   (1) pre-calcining a zirconium salt to obtain a pre-calcined product,
   (2) milling the pre-calcined product; and
   (3) calcining a resultant of the milling in an atmosphere containing hydrogen chloride, wherein the resultant is a combination with:
   (i) a compound of at least one element selected from the group consisting of Y, Ce, Ca, Ti and Mg, which compound is converted to an oxide of said element by calcining, or
   (ii) an oxide of at least one element selected from the group consisting of Y, Ce, Ca, Ti and Mg.

8. The process for producing zirconia powder according to claim 7, wherein the pre-calcining is carried out at a temperature of 400 to 700° C.

9. The process for producing zirconia powder according to claim 7, wherein the zirconium salt contains zirconium oxychloride.

10. The process for producing zirconia powder according to claim 7, wherein the atmosphere containing hydrogen chloride has a concentration of hydrogen chloride of not less than 1% by volume.

11. The process for producing zirconia powder according to claim 7, wherein the calcining is carried out at a temperature of 700 to 1100° C.

12. The process for producing zirconia powder according to claim 7, wherein the pre-calcined product is a combination with a seed crystal.

13. The process for producing zirconia powder according to claim 7, wherein the zirconium salt is a combination with:
   (i) an aluminum compound, which is converted to alumina by calcining, or
   (ii) alumina.

14. The process for producing zirconia powder according to claim 7, wherein the zirconium salt is at least one selected from the group consisting of zirconium oxychloride, zirconium nitrate, zirconium chloride and zirconium sulfate.

* * * * *